Jan. 14, 1936.  J. SCHRAGER  2,027,791
CONFECTION COVER
Filed April 5, 1933
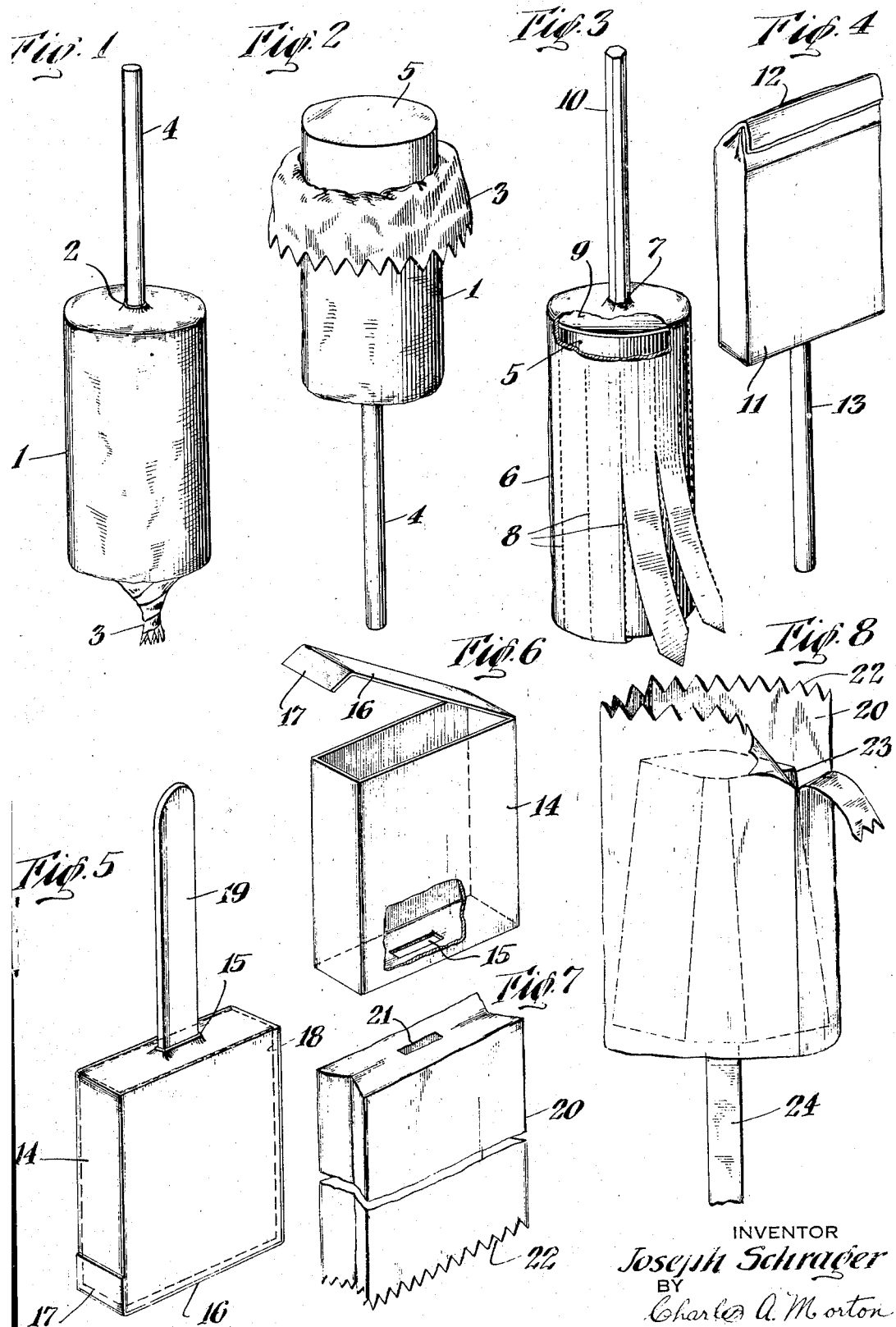
INVENTOR
Joseph Schrager
BY
Charles A. Morton
ATTORNEY Patented Jan. 14, 1936

2,027,791

UNITED STATES PATENT OFFICE 2,027,791

CONFECTION COVER

Joseph Schrager, Brooklyn, N. Y.

Application April 5, 1933, Serial No. 664,538

3 Claims. (Cl. 206—56)

This invention relates to confection covers for confections with handles, and more particularly to ice cream and other similar confections having a stick embedded within the confection to constitute a handle.

One object of this invention is an improved confection cover for confections of the class described.

Another object is to render the confection sanitary not only during storage but during the eating process until entirely consumed.

Another object is a confection cover which permits the progressive exposure of the confection during consumption thereof.

Other objects will appear from the following description.

In the drawing comprising one sheet of eight figures numbered Figs. 1 to 8 inclusive:

Fig. 1 is a perspective view of one form of confection with the cover in place;

Fig. 2 is an inverted view with the cover partially removed preparatory to eating;

Fig. 3 is a perspective view of another form of confection and confection cover;

Fig. 4 is a perspective view of another form of confection and confection cover;

Fig. 5 is a perspective view of another modification;

Fig. 6 is a perspective view of the cover of Fig. 5 open and with the confection and stick removed;

Fig. 7 is a perspective view of another form of confection cover; and

Fig. 8 is a perspective view of another form of confection enclosed within a cover of the form shown in Fig. 7.

Like reference characters designate corresponding parts throughout the several figures.

Referring to Figs. 1 and 2 a stick 4 is embedded within the end of a confection 5, the stick thus forming a handle. A cover 1 is provided, consisting essentially of a cap or end portion having an opening 2 therein for receiving the stick 4, said cap having side walls in continuation thereof which merge together to define a tubular extension closed at the upper end by the cap. The open end of the tubular extension may be serrated around the mouth thereof to facilitate tearing of the side wall thereby exposing the confection. The tubular extension of the cover 1 is preferably longer than the confection 5, to afford an overlap capable of being twisted as indicated at 3, or folded as indicated at 12 (Fig. 4) to completely enclose the confection 5 within the sanitary sealed housing thus formed by the cover 1. The opening 2 may be designed to afford frictional engagement between the cap and the stick 4, so as to tend to prevent the cover from sliding down the stick during the eating operation.

The cover may be made of any suitable material and may be translucent or transparent. It is preferably flexible although a stiffer material constructed in the form of a carton of appropriate shape (Figs. 5 and 6) may be employed if desired. Thin waxed paper or "cellophane" are well suited for the purpose.

Fig. 3 is a modification wherein a cover 6 provided with tearing lines 8 is employed. The stick 10 is hexagon shaped and the hole 7 in the end cap may be shaped to correspond. The end cap may be reinforced by a disc of stiff material placed beneath it, or the cover 6 may be secured to the disc 9, by suitable adhesive or otherwise. The various elongated strips having the tearing lines 8, are tapered at the ends thereof to form an end disc when correctly folded. Preparatory to eating the tapered ends are opened and the cover partially separated along the tearing lines 8—8 and the loose ends are then peeled back to expose the confection 5, and as the confection 5 is progressively consumed the peeling operation is continued.

Fig. 4 is a modification showing the invention as applied to a confection rectangular in cross section. The stick 13 is embedded in the confection which is in turn enclosed within a cover 11. The mouth of the cover is folded as indicated at 12 to house the confection within the cover 11. The cap constituting the closed end of the cover 11 is provided with an opening for permitting the free passage of the stick 13 forming the handle. The wall of cover 11 constituting the mouth thereof may be serrated as indicated at 22 in Fig. 7 or the wall of the cover 11 may be provided with tearing strips similar to 8—8 (Fig. 3).

In Fig. 5 still another modification is shown employing a flattened stick 19 for the confection 18. The cover which is more clearly illustrated in Fig. 6 is in the form of a carton 14 having an opening 15 in the end cap for receiving the stick 19. The confection is positioned entirely within the cover 14 and closure is effected by means of a flap 16 having a bent over lip portion 17 which may be inserted within the mouth of the cover or secured to the outer wall thereof as indicated at Fig. 5 as preferred.

Figs. 7 and 8 illustrate still another modification of the confection and confection cover. The confection 23 (Fig. 8) is provided with a handle 24, the hole enclosed within a cover 20 provided with an opening 21 for the stick. The mouth of the cover may be serrated as indicated at 22 to facilitate tearing in the peeling operation. If preferred the cover 20 may be provided with tearing strips 8—8 (Fig. 3) to facilitate peeling. As indicated in Fig. 8 the confection is enclosed within the cover which extends beyond the end thereof. The cover may be folded as indicated at 12 in Fig. 4 but in some cases it may be found more convenient to leave the mouth of the bag open as shown at Fig. 8.

The several modifications illustrated in the various figures of the drawing indicate that the invention may be modified in many ways, but in every instance it will be observed that the cover permits the handle to protrude through an opening in the end cap to provide a handle for the user. In each case the side wall of the cover may be peeled or folded back during the process of eating the confection until the entire confection is completely consumed. The cover accordingly not only functions to provide a sanitary commercial package for shipping and storage purposes, but also provides a shield for the consumer during the eating operation whereby any drippings will accumulate within the cup like vessel formed by the housing, as best indicated in Fig. 2. The confection may be so proportioned that it fills the cover entirely, so that the cover in effect constitutes an outer skin for the confection; but in many cases it will be found desirable to make the confection slightly smaller than the cover to permit the ready insertion of the confection therein. Generally a cover made of flexible paper will be found entirely satisfactory but in some cases "Cellophane" may be preferred, while in others a stiff carton like container such as is illustrated in Figs. 5 and 6 may be preferred. There is a tendency for a frozen confection to break away from the stick when being eaten due to the fact that as the confection begins to melt it tends to break at its weakest point, which is at the point where the stick has been inserted. The confection cover tends to act as a holder or reinforcement thereby retaining the body of the confection within the housing formed by the confection cover. In this manner the tendency of the confection to break from the stick is limited.

What is claimed is:

1. A commercial package comprising the combination of a confection, a handle embedded within the body of said confection, a one-piece bag like paper covering for the confection, said covering having an opening in the sealed end thereof affording a free passage for the handle, the cover extending beyond the free end of the confection, and being foldable at the mouth thereof around the free end of the confection said covering thereby defining a continuously sealed one-piece sanitary housing for the confection, and there being tearing lines formed in the covering starting from the mouth thereof to facilitate the progressive exposure of the free end of the confection during the eating operation.

2. A combined cover and shield for a confection provided with a handle pre-embedded in the confection comprising a one piece paper cap having a centrally disposed opening therethrough substantially conforming in size and contour to a cross section of the confection handle, said cap being slightly larger in area than the handle end of the confection, and pliable paper side walls of uniform length, said side walls merging with said cap in unbroken continuity, and extending downwardly therefrom in unbroken continuity to define in conjunction with said cap and with each other a preformed one piece pliable bag like housing for receiving a confection to be thereafter inserted therein, the side walls being longer than the confection to be housed and being foldable or sealable to effect a closure for the housed confection.

3. A combined cover and shield for a confection provided with a handle pre-embedded in the confection comprising a one piece paper cap having a centrally disposed opening therethrough substantially conforming in size and contour to a cross section of the confection handle, said cap being slightly larger in area than the handle end of the confection, pliable paper side walls of uniform length, said side walls merging with said cap in unbroken continuity, and extending downwardly therefrom in unbroken continuity to define in conjunction with said cap and with each other a preformed one piece pliable bag like housing for receiving a confection to be thereafter inserted therein, and a series of serrations positioned at the extreme lower edge of the side walls and defining the preformed mouth of the housing, said serrations facilitating progressive separation of the housing side walls, the side walls being longer than the confection to be housed and foldable or sealable to effect a closure for the housed confection.

JOSEPH SCHRAGER.